US008251350B2

(12) United States Patent
Fick et al.

(10) Patent No.: US 8,251,350 B2
(45) Date of Patent: Aug. 28, 2012

(54) RIDING MOWER RAMP

(75) Inventors: Orval Lee Fick, Miami, OK (US); Charlie L. Forbis, Quapaw, OK (US)

(73) Assignee: Hopkins Manufacturing Corporation, Emporia, KS (US)

( * ) Notice: Subject to any disclaimer, the term of this patent is extended or adjusted under 35 U.S.C. 154(b) by 736 days.

(21) Appl. No.: 12/489,953

(22) Filed: Jun. 23, 2009

(65) Prior Publication Data

US 2010/0096605 A1 Apr. 22, 2010

Related U.S. Application Data

(63) Continuation-in-part of application No. 29/326,559, filed on Oct. 20, 2008, now Pat. No. Des. 608,520.

(51) Int. Cl.

| | |
|---|---|
| ***E02C 3/00*** | (2006.01) |
| ***A47F 5/00*** | (2006.01) |
| ***E04G 25/00*** | (2006.01) |
| ***F16M 13/00*** | (2006.01) |
| *B66F 7/24* | (2006.01) |

(52) U.S. Cl. .......................................... 254/88; 248/352

(58) Field of Classification Search ..................... 254/88
See application file for complete search history.

(56) References Cited

U.S. PATENT DOCUMENTS

| | | | | |
|---|---|---|---|---|
| 1,947,346 | A | | 1/1934 | Lintern |
| 2,712,432 | A | | 7/1955 | Thornton, Jr. |
| 3,512,613 | A | | 5/1970 | Peterson |
| 3,684,233 | A | | 8/1972 | Vukich |
| 3,879,014 | A | | 4/1975 | Larson |
| 4,034,961 | A | | 7/1977 | Breen |
| 4,877,211 | A | * | 10/1989 | Orr ............................... 248/352 |
| RE34,889 | E | | 4/1995 | Fogarty et al. |
| 5,483,715 | A | | 1/1996 | Fogarty et al. |
| D493,408 | S | | 7/2004 | Chrisco et al. |
| D500,979 | S | | 1/2005 | Chrisco et al. |
| D502,139 | S | | 2/2005 | Chrisco et al. |
| 7,000,740 | B2 | | 2/2006 | Chrisco et al. |
| 7,040,461 | B2 | | 5/2006 | Chrisco et al. |
| D524,222 | S | | 7/2006 | Chrisco et al. |
| D542,876 | S | * | 5/2007 | Laurienzo et al. ........... D21/817 |
| 7,278,627 | B2 | | 10/2007 | Jones |
| D567,471 | S | * | 4/2008 | Haimoff ......................... D34/33 |
| D577,651 | S | * | 9/2008 | Shaw ........................... D12/217 |

OTHER PUBLICATIONS

California Car Cover Co. catalog, front and back covers, p. 46 (2004).

* cited by examiner

*Primary Examiner* — Lee D Wilson
*Assistant Examiner* — Alvin Grant

(57) ABSTRACT

A ramp is provided for lifting and supporting a wheel of a vehicle thereon when the wheel is driven onto the ramp. The ramp includes a body that is shiftable between a ready position and a discrete support position and presents a ground-engaging surface including a first portion that engages the ground in the ready position and a second portion that engages the ground in the support position. The first and second surface portions are substantially planar and define an angle therebetween through which the body rocks about a fixed pivot as a wheel moving along a wheel-engaging surface causes the body to move from the ready position to the support position. A pair of ramps is provided for lifting and supporting a pair of wheels, with the ramps being nestable for compact storage.

20 Claims, 5 Drawing Sheets

RIDING MOWER RAMP

CROSS-REFERENCE TO RELATED APPLICATIONS

This application is a continuation-in-part of U.S. Design patent application Ser. No. 29/326,559, entitled RIDING MOWER RAMP, filed Oct. 20, 2008, which is hereby incorporated by reference herein.

BACKGROUND OF THE INVENTION

1. Field of the Invention

The present invention relates generally to a ramp for use in raising and supporting a wheel of a riding mower or similar machine for maintenance purposes. More specifically, the present invention concerns a ramp that includes substantially planar ground-engaging surface portions that define a ready position and a support position, with the ramp being configured to rock over center from one position to the other in response to the wheel being driven along a wheel-engaging surface.

2. Discussion of the Prior Art

Those of ordinary skill in the art will appreciate that riding mowers and similar machines require occasional maintenance. With such machinery, it can be difficult to access the underneath portion of the machine (as may be required to change the oil or check the blade) when the machine is right side up and on the ground. Turning the machine over to access the underneath portion is often undesirable for various reasons, such as difficulty in moving a heavy machine and/or the desire to prevent liquids from spilling. Therefore a riding mower or similar machine to be worked on is typically raised and supported during maintenance operations.

Traditionally, this raising can be accomplished with devices such as a jack or a lift. While each of these devices are satisfactory in some respects, each also presents drawbacks. A jack, for example, can be heavy, requires a jacking point on the machine that can adequately support the load, and often works best on flat ground. A lift is very expensive and is often overkill for an operator that only needs to raise the machine off the ground a small distance. Those of ordinary skill in the art will also appreciate that a drive-on jack or ramp can be used to lift a vehicle wheel, but such conventional jacks or ramps have curved ground-engaging surfaces that make it difficult for an operator to determine when the vehicle is properly supported in a stable position on the jack or ramp.

SUMMARY

The present invention provides a ramp for use in raising and supporting a wheel of a riding mower or other vehicle for maintenance purposes. The ramp includes a body that is shiftable between a ready position and a discrete support position and presents a ground-engaging surface including a first portion that engages the ground in the ready position and a second portion that engages the ground in the support position. The first and second surface portions are substantially planar and define an angle therebetween through which the body rocks about a fixed pivot as a wheel moving along a wheel-engaging surface causes the body to move from the ready position to the support position.

As the ramp rocks about a fixed pivot point from the ready position to the support position, the shifting of the body from the first substantially planar surface to the second substantially planar surface provides clear feedback to an operator of the vehicle that the wheel is supported on the ramp in a stable support position. The feedback provided by the shifting of the body between discrete positions allows the operator to eliminate the guesswork or need for a spotter associated with traditional ramps. The rocking feedback feature provides ease of use and safety to the operator using the ramp.

According to one aspect of the present invention, a ramp is provided for lifting and supporting a wheel of a vehicle thereon when the wheel is driven onto the ramp. The ramp includes a body having opposite first and second ends, with a portion of the body tapering to the first end. The body includes an upper wheel-engaging surface extending between the body ends, with the wheel-engaging surface being configured to engage the vehicle wheel when driven and supported thereon. The body further includes a ground-engaging surface extending between the body ends and being opposite the wheel-engaging surface. The ground-engaging surface includes a first surface portion adjacent the first body end, with the wheel-engaging surface and the first surface portion converging toward the first body end. The ground-engaging surface further includes a second surface portion adjacent the second body end, with the wheel-engaging surface and the second surface portion being spaced apart in a substantially parallel relationship, with each of the first and second surface portions being substantially planar. The first and second surface portions cooperatively define an angle therebetween to present a body pivot about which the body rocks when the vehicle wheel is driven onto the wheel-engaging surface. The body is configured to rock about the pivot from a ready position, in which the first surface portion engages the ground to facilitate driving of the vehicle wheel onto the wheel-engaging surface, to a support position, in which the second surface portion engages the ground and the vehicle wheel is supported on the wheel-engaging surface and thereby elevated above the ground.

Another aspect of the present invention concerns a pair of nestable ramps for lifting and supporting a pair of vehicle wheels when the wheels are driven onto the ramps. Each of the ramps of the nestable pair includes a body having opposite first and second ends, with a portion of the body tapering to the first end. The body includes an upper wheel-engaging surface extending between the body ends, with the wheel-engaging surface being configured to engage the vehicle wheel when driven and supported thereon. The body further includes a ground-engaging surface extending between the body ends and being opposite the wheel-engaging surface. The ground-engaging surface includes a first surface portion adjacent the first body end, with the wheel-engaging surface and the first surface portion converging toward the first body end. The ground-engaging surface further includes a second surface portion adjacent the second body end, with the wheel-engaging surface and the second surface portion being spaced apart in a substantially parallel relationship, with each of the first and second surface portions being substantially planar. The first and second surface portions cooperatively define an angle therebetween to present a body pivot about which the body rocks when the vehicle wheel is driven onto the wheel-engaging surface. The body is configured to rock about the pivot from a ready position, in which the first surface portion engages the ground to facilitate driving of the vehicle wheel onto the wheel-engaging surface, to a support position, in which the second surface portion engages the ground and the vehicle wheel is supported on the wheel-engaging surface and thereby elevated above the ground. The body is substantially hollow and includes a pair of spaced apart sidewalls and a back wall, each of which extend between the wheel-engaging and ground-engaging surfaces, with the lower margins of the walls cooperatively defining the ground-engaging surface.

The body defines an interior chamber between the sidewalls, the back wall, and the wheel-engaging surface, and an open face communicating with the chamber. The body includes at least one supporting leg extending through the internal chamber between the wheel-engaging surface and the open face to present a ground-contacting leg portion. The supporting leg presents a hollow center projecting from the wheel-engaging surface and an open leg face along the wheel-engaging surface. The open leg face presents an area that is greater than that of the ground-contacting leg portion such that the supporting leg tapers toward the ground.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 2:
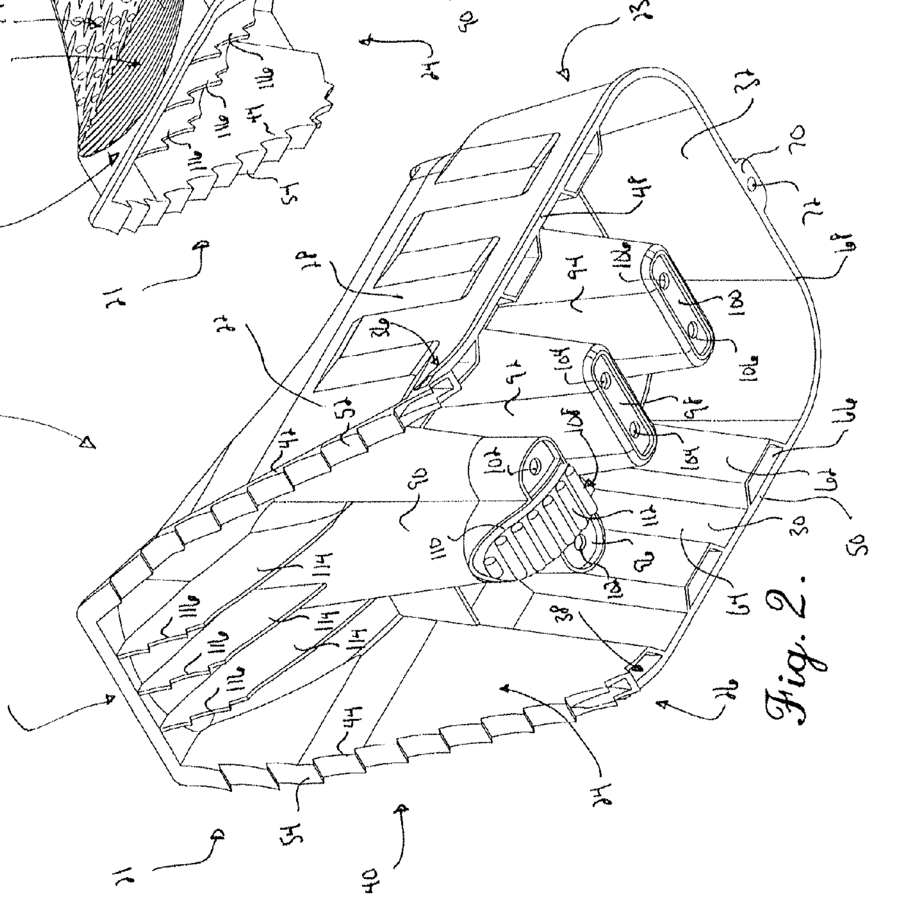
FIG. 2 is a perspective view of the ramp of FIG. 1, shown from the opposite vantage point and viewed generally from below looking up at the open face, ground-engaging surface portions, and supporting legs.
Figure 5:
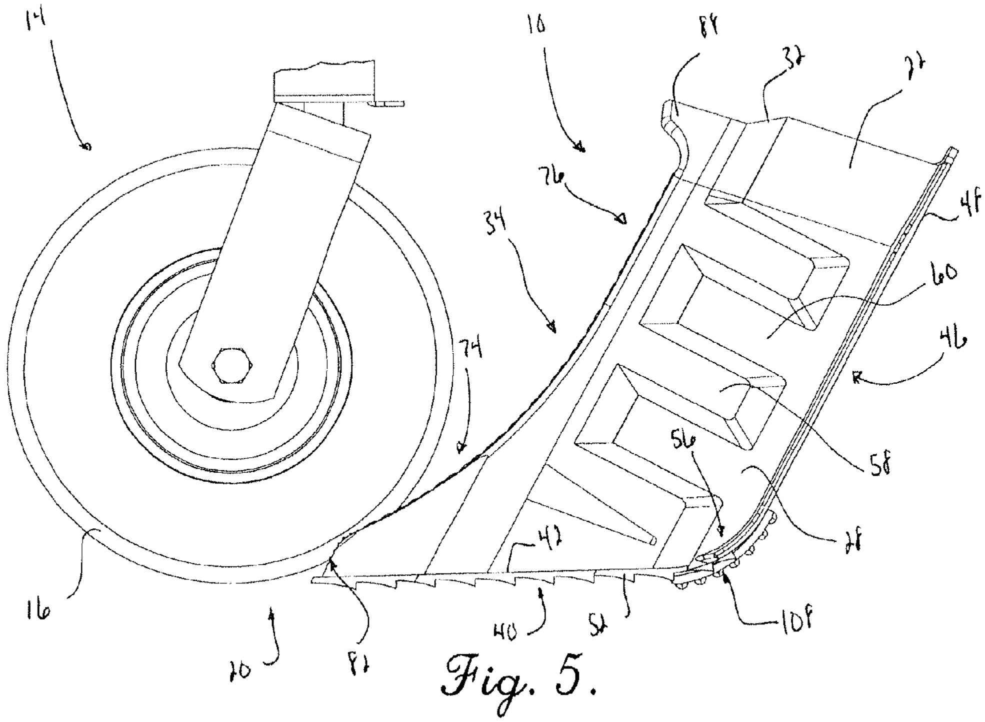
FIG. 5 is an enlarged, fragmentary, environmental side elevational view of the ramp and wheel shown in FIG. 4, depicting in detail a ribbed margin of a ground-engaging surface portion and a ribbed foot of a supporting leg.
Figure 8:
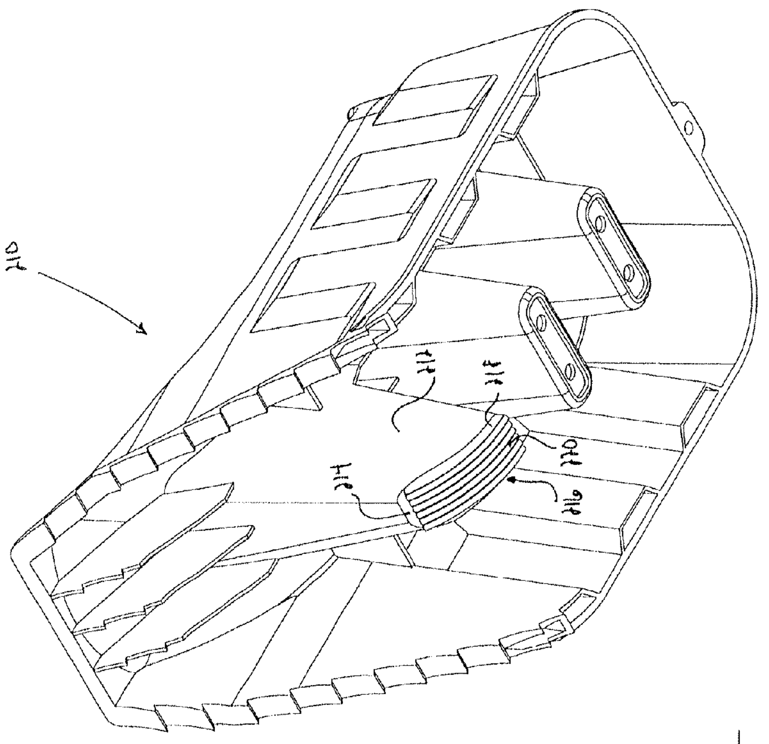
Figure 6:
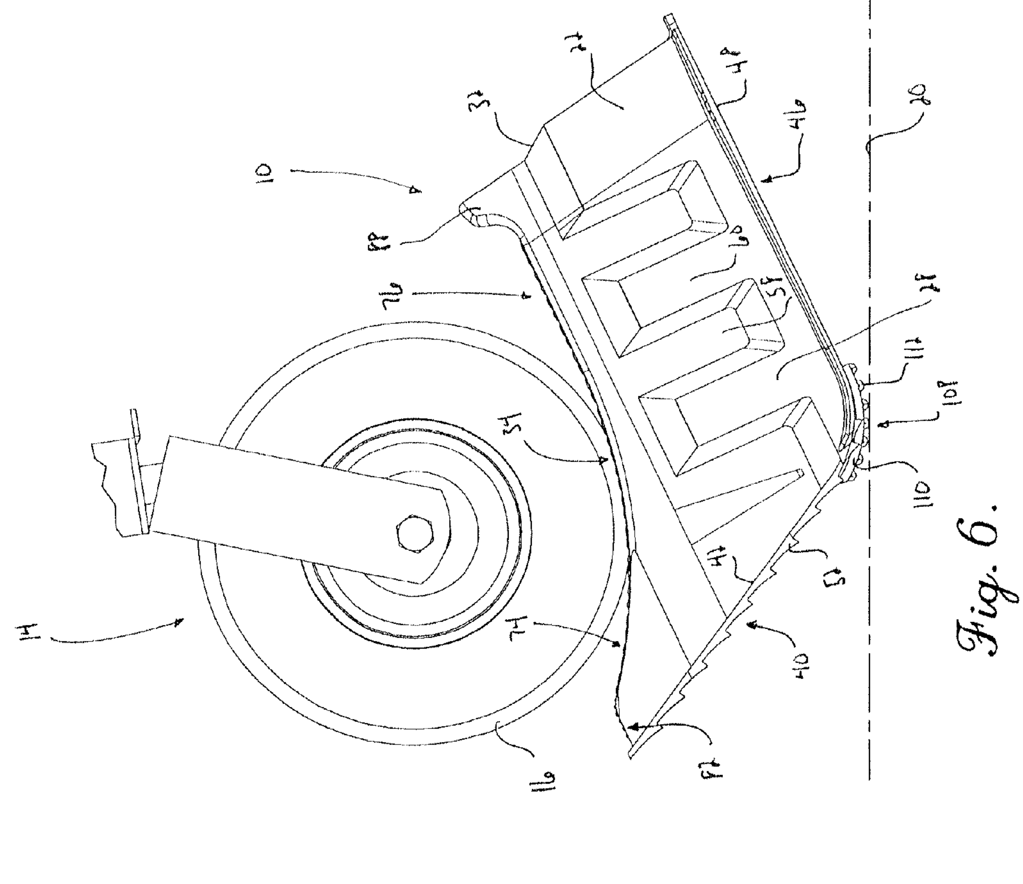
Figure 7:
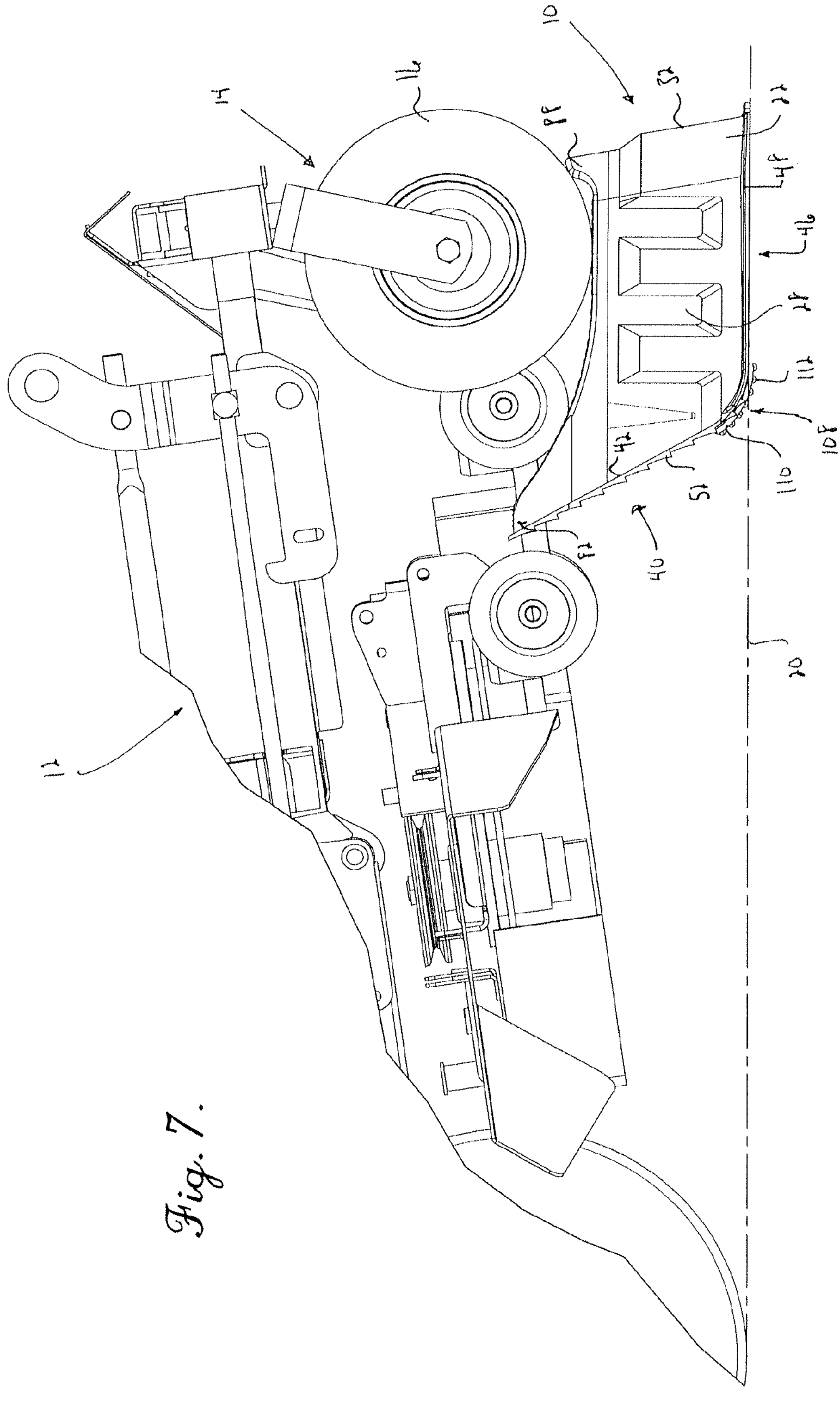

FIG. 6 is an enlarged, fragmentary, environmental side elevational view of the ramp and wheel shown in FIG. 5, illustrated with the wheel having been driven partially up the wheel-engaging surface of the ramp so that the ramp has begun to rock over center, depicting in detail the ribbed foot of the supporting leg in contact with the ground and the ramp rocking from a first ground-engaging surface portion to a second ground-engaging surface portion;

FIG. 7 is a fragmentary, environmental side elevational view of the ramp and wheel shown in FIG. 6, illustrated with the wheel of the mower having been driven fully up the wheel-engaging surface of the ramp so that the ramp has rocked over center to a support position and is supported on the second ground-engaging surface portion, with the wheel disposed adjacent a lip; and FIG. 8 is a perspective view of another embodiment of a ramp constructed in accordance with the principles of another embodiment of the present invention and similar in many respects to the ramp shown in FIG. 2, viewed generally from below looking up at the open face, ground-engaging surface portions, and the alternative supporting leg.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
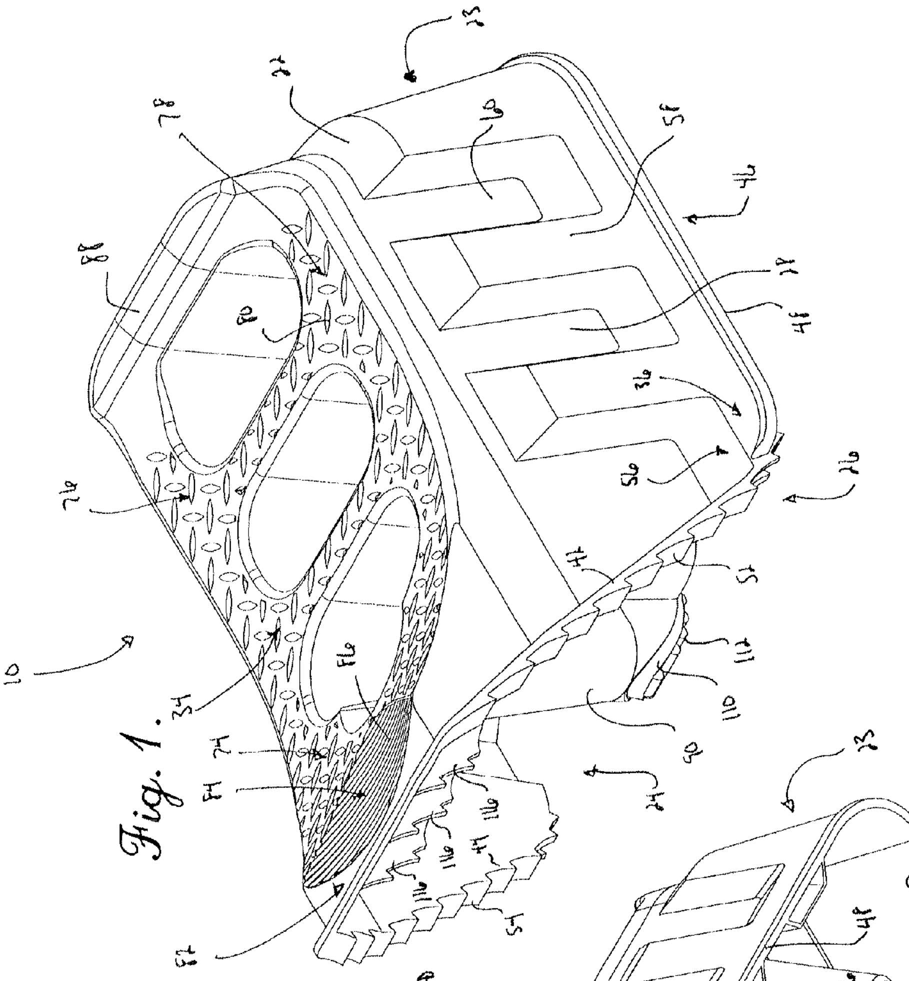
FIG. 1 is a perspective view of a ramp constructed in accordance with the principles of a preferred embodiment of the present invention, shown in a support position and viewed generally from above looking down on a wheel-engaging surface.
Figure 3:
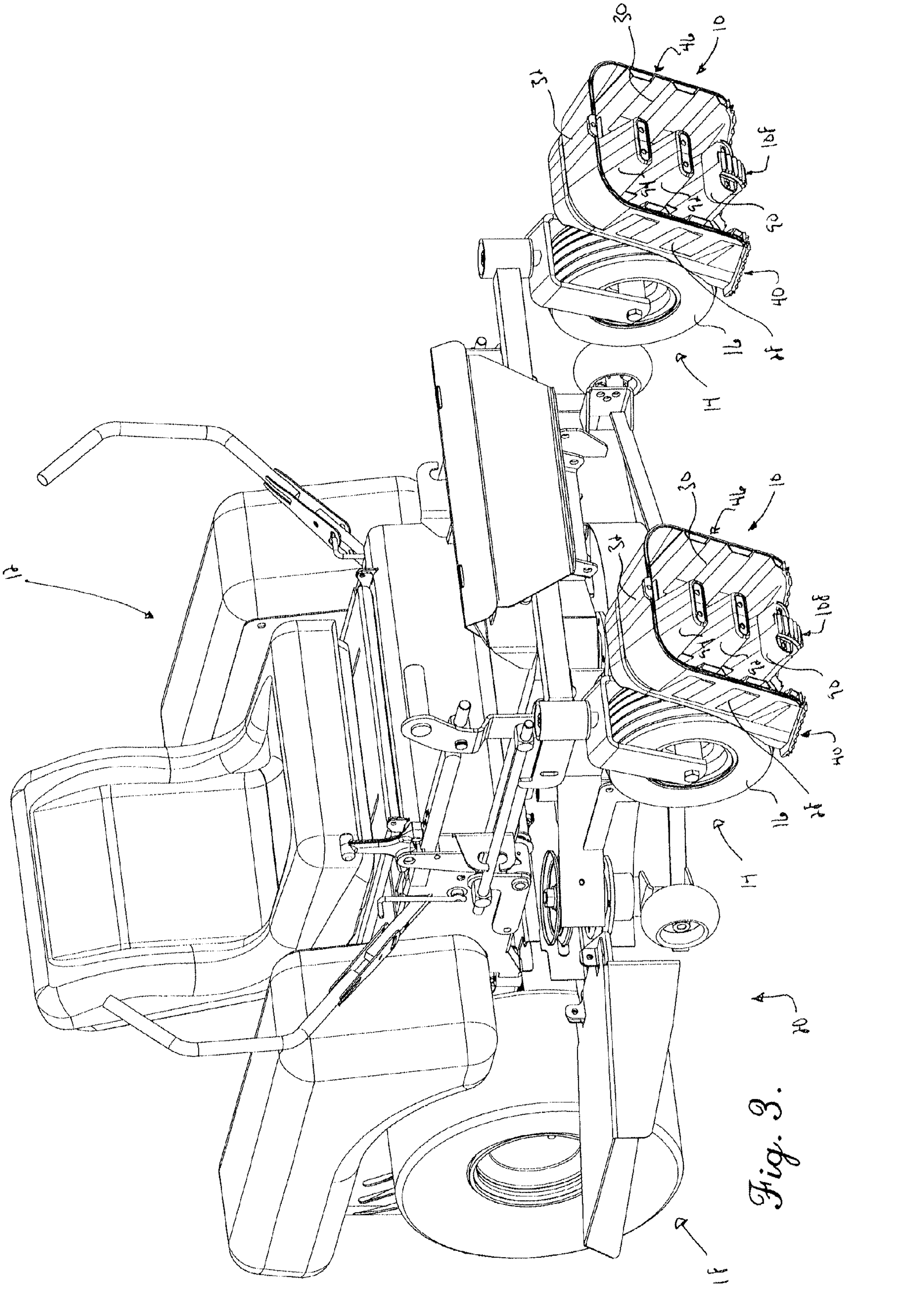
FIG. 3 is an environmental perspective view of a pair of the ramps of FIG. 1, depicting each of the ramps in a ready position and a riding mower positioned with front wheels disposed adjacent leading margins of the ramps.

With initial reference to FIGS. 1 and 2, a ramp 10 constructed in accordance with a preferred embodiment of the present invention is configured to lift and support a wheel of a vehicle as such a wheel is driven onto the ramp 10. Turning briefly to FIG. 3, a vehicle in the form of a mower 12 is depicted in association with a pair of ramps 10. As will be readily appreciated by one of ordinary skill in the art, the mower 12 depicted in FIG. 3 is illustrated by way of example only as one possible vehicle that can be used in conjunction with the ramp 10 for lifting and supporting of the same. The ramp 10 could alternatively be used to lift and support a portion of various other wheeled machines or mowers without departing from the teachings of the present invention.

The mower 12 used in the illustrated embodiment is generally conventional in the art and, therefore, will not be described in detail herein. Sufficient for purposes of describing the construction and operation of the ramp 10, the mower 12 includes a pair of front wheel assemblies 14, with each wheel assembly 14 being pivotally supported for rotation and including a tire 16. The mower 12 also includes a pair of rear wheel assemblies 18 (with only one such wheel assembly 18 being visible in FIG. 3) that are operably connected to, and driven by, an engine or other prime mover (not shown). The plurality of wheel assemblies 14 and 18 support the mower 12 on the ground 20 for movement and operation of the mower 12. Thus, in a conventional fashion readily appreciated by one of ordinary skill in the art, the mower 12 is powered to drive the front wheel assemblies 14 into engagement with the ramp 10, for support thereon, as will be described in further detail below.

Returning now to FIGS. 1 and 2, it is initially noted that only one ramp 10 is depicted and described in detail herein. It is to be understood, however, that the use of a single ramp 10 or a plurality of such ramps 10 to lift and support either a single wheel 14 or a plurality of wheels 14, respectively, is clearly encompassed by the ambit of the present invention. For example, as shown in FIG. 3, a pair of ramps 10 can be associated with a pair of front wheels 14 to lift and support a front portion of the mower 12. Alternatively, four ramps 10 could be used to support four corresponding wheels (or additional corresponding sets of ramps and wheels) in order to lift and support either additional wheels of a vehicle or all wheels of a vehicle to lift and support the entire vehicle above the ground 20.

The ramp 10 broadly includes a substantially hollow body 22 with a first end 21 and an opposite second end 23. The body 22 defines an internal chamber 24 in communication with a ground-engaging open face 26 presented by the body 22. The body 22 includes a pair of sidewalls 28, 30, a back wall 32 extending between and adjoining the sidewalls 28, 30, and a wheel-engaging surface extending between and enclosing the sidewalls 28, 30 and the back wall 32.

Figure 4:
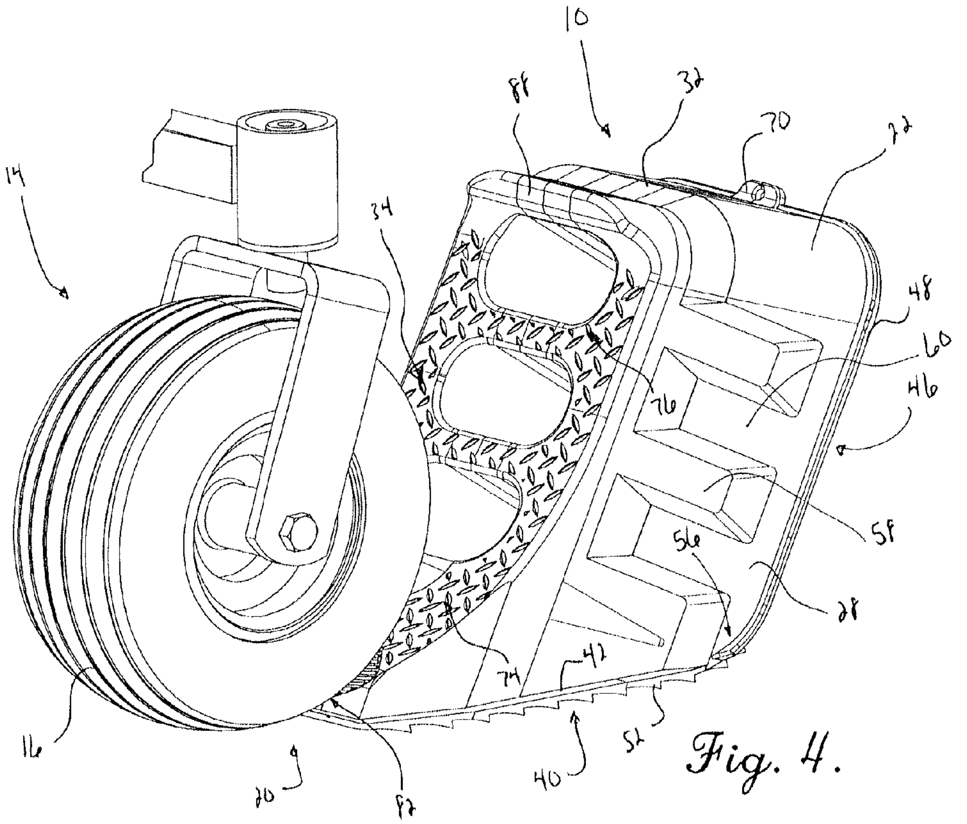
FIG. 4 is an enlarged, fragmentary, environmental perspective view of one of the ramps shown in FIG. 3, depicting in detail the wheel-engaging surface of the ramp with the wheel of the mower disposed adjacent the leading margin of the ramp.

In more detail, the sidewalls 28, 30 are mirror images of one another, with each sidewall 28, 30 being configured to extend downwardly from the wheel-engaging surface 34 such that the pair of sidewalls 28, 30 present margins 36, 38 that cooperatively define the ground-engaging face 26. The ground-engaging face 26 includes a first surface portion 40 that is defined by first lower margin portions 42, 44 of the sidewalls 28, 30. The first surface portion 40 is configured to engage the ground 20 when the ramp 10 is in a ready position (as is depicted in FIGS. 3, 4, and 5). The ground-engaging face 26 also includes a second surface portion 46 that is defined by second lower margin portions 48, 50 of the sidewalls 28, 30. The second surface portion 46 is configured to engage the ground 20 when the ramp 10 is in a support position (as is depicted in FIG. 7).

The first ground-engaging surface portion 40 is substantially planar, as the first margin portions 42, 44 extend generally linearly. The first margin portions 42, 44 each include a plurality of ground-engaging teeth 52, 54, respectively, as shown particularly in FIGS. 2, 4, and 5. The teeth 52, 54 angle away from the wheel-engaging surface 34 such that as the wheel 14 engages the ramp 10 when in the ready position (see FIGS. 4 and 5), the teeth 52, 54 generally prevent the ramp 10 from sliding in a backward direction away from engagement with the wheel 14.

The second ground-engaging surface portion 48 is also substantially planar, as the second margin portions 48, 50 extend generally linearly. The second margin portions 48, 50 are each substantially flat, as shown particularly in FIGS. 2 and 5. The substantially flat second margin portions 48, 50 provide bearing support against the ground 20 when the ramp 10 is in the support position (see FIG. 7).

An angle 56 is cooperatively defined between the first ground-engaging surface portion 40 and the second ground-engaging surface portion 48. In the illustrated embodiment, the angle 56 is obtuse, measuring approximately one hundred twenty degrees, although alternative angles between the first and second ground-engaging surface portions 48, 50 are clearly within the ambit of the present invention. The angle 56 presents a body pivot about which the body 22 rocks when the wheel 14 is driven onto the wheel-engaging surface 34. As will be described in further detail below, as the ramp 10 rocks between the ready position and the support position in response to the wheel 14 being driven along the wheel-engaging surface 34, the body 22 rocks about the pivot defined by the angle 56 and over center to provide feedback to an operator of the mower 12 that the wheel 14 is supported on the ramp 10 in a stable support position.

With reference again to FIGS. 1 and 2, the sidewalls 28, 30 additionally present a plurality of corresponding pairings of outwardly extending outer protrusions 58 and outer recesses 60. The outer protrusions 58 and the outer recesses 60 stretch along a generally vertical direction (when the ramp 10 is viewed in the support position) and extend along the sidewalls 28, 30 substantially between the second margin portions 48, 50 and the wheel engaging surface 34. Each of the sidewalls 28, 30 also presents a plurality of corresponding pairings of inwardly extending inner protrusions 62 and inner recesses 64. The inner protrusions 62 and the inner recesses 64 also stretch along a generally vertical direction (when the ramp 10 is viewed in the support position) and extend along the sidewalls 28, 30 substantially between the second margin portions 48, 50 and the wheel engaging surface 34.

As will be readily understood by one of ordinary skill in the art upon review of this disclosure, the outer protrusions 58 and the inner protrusions 62 add structural strength to the unitary construction of the ramp 10. With particular attention to FIG. 2, it is noted that the inner protrusions 62 define vertically extending channels 66 that extend upwardly from the second margin portions 48, 50. It will also be readily appreciated that the corresponding pairings of protrusions 58, 62 and recesses 60, 64 are configured to facilitate aligned nesting of multiple ramps 10, as will be discussed in detail below. It will be noted, however, that the particular shape and design of the protrusions and recesses may be varied without departing from the spirit and scope of the present invention.

As previously described, the back wall 32 extends between and adjoins the sidewalls 28, 30. In more detail, with continued reference to FIGS. 1 and 2, and also to FIG. 3, the back wall 32 presents a lowermost ground-engaging margin 68 that cooperates with the second margin portions 48, 50 of the sidewalls 28, 30 to define the second ground-engaging surface portion 46. The back wall 32 presents a generally trapezoidal configuration that defines a major dimension along the lowermost ground-engaging margin 68 and a minor dimension adjacent the junction of the back wall 32 and the wheel-engaging surface 34. In this manner, the sidewalls 28, 30 angle at least slightly outwardly relative to one another from top to bottom to provide stability to the ramp 10 and facilitate nesting of multiple ramps 10, as will be discussed in detail below.

The ramp 10 also includes a flange 70 that projects outwardly from the back wall 32 adjacent the lowermost ground-engaging margin 68 thereof. The flange 70 includes a hanging hole 72 extending therethrough that is configured to receive a hook, nail, or other type of receiver (not shown) to secure the ramp 10 during storage (e.g., hanging on a wall, etc.). Additionally, as described in more detail below, the hanging hole 72 can also be used to secure the ramp 10 to the ground during use.

With reference now to FIGS. 1 and 4, the wheel-engaging surface 34 of the ramp 10 includes a driving surface portion 74 and a supporting surface portion 76. In the illustrated embodiment, the driving surface portion 74 is generally arcuate and the supporting surface portion 76 is generally flat, with the driving surface portion 74 defining a radius of curvature that gently increases along the span of the driving surface portion 74 from an end opposite the supporting surface portion 76 to the junction with the supporting surface portion 76. In this way, the driving surface portion 74 and the supporting surface portion 76 seamlessly merge to form the continuous wheel-engaging surface 34. A substantial portion of the wheel-engaging surface 34 includes a textured pattern 78 composed of a plurality of raised segments 80 that are configured to provide traction against the wheel 14 of the mower 12 during operation, as is described below.

Turning briefly to FIG. 7, it is noted that the supporting surface portion 76 of the wheel-engaging surface 34 and the second ground-engaging surface portion 46 are spaced apart in a substantially parallel relationship. Thus, when the ramp 10 is in the support position, with the wheel 14 positioned on the generally flat supporting surface portion 76, the wheel 14 is disposed above the second ground-engaging surface portion 46 and is spaced from the pivot so as to be securely disposed in the support position and unlikely to rock back to the ready position unless the wheel 14 is moved back along the wheel-engaging surface 34 to at least a portion of the driving surface portion 74, as will be readily appreciated by one of ordinary skill in the art upon review of this disclosure.

Returning to FIGS. 1 and 4, the driving surface portion 74 includes a leading margin 82 that is configured to engage the wheel 14 of the mower 12 when the ramp 10 is disposed in the ready position (see FIGS. 4 and 5). In the illustrated embodiment, the leading margin 82 includes a concavely scalloped surface 84 that includes a second textured pattern 86 to facilitate engagement of the wheel 14 with the ramp 10 such the driving of the wheel 14 moves the wheel 14 up the wheel-engaging surface 34. While the textured pattern 78 and the second textured pattern 86 are different in the embodiment depicted, such details are by way of example only, as alternative texture patterns (including the same pattern or even no pattern all) could alternatively be used on the wheel-engaging surface 34 and/or the scalloped surface 84 without departing from the teachings of the present invention.

With particular attention to FIGS. 4, 5, and 6, the back wall 32 of the body 22 includes an upwardly-extending lip 88 that projects above the wheel-engaging surface 34. As will be readily appreciated by one of ordinary skill in the art upon review of this disclosure, and as shown particularly in FIG. 7, the lip 88 may contact the wheel 14 of the mower 12 and serve as a stop for the wheel 14 when the wheel 14 is driven onto the wheel-engaging surface 34 and the ramp 10 has rocked into the support position.

With attention now to FIG. 2, the body 22 of the ramp 10 also includes a plurality of support legs, including a first leg 90, a second leg 92, and a third leg 94. It is noted initially that alternative embodiments (not shown) may have a different number of support legs than what is shown in the illustrated embodiment (i.e., more or fewer than three support legs, including no support legs at all) while remaining within the ambit of the present invention. Each of the support legs 90, 92, and 94 extends from the wheel-engaging surface 34, through the internal chamber 24, projecting down to the open ground-engaging face 26 of the body 22. In this manner, a portion of the first support leg 90 is configured to engage the ground 20 when the ramp 10 is in either the ready position or the support position (as shown in FIGS. 5 and 7, respectively). The second support leg 92 and the third support leg 94, in contrast, are configured to engage the ground 20 only when the ramp 10 is in the support position (as shown in FIG. 7).

Each of the support legs 90, 92, and 94 includes a terminal ground-engaging face 96, 98, and 100, respectively, at the bottom end thereof. The ground-engaging faces 96, 98, and 100 are substantially coplanar with the ground-engaging face 26 of the ramp 10. Additionally, the support legs 90, 92, and 94 are hollow or open in the center so that the open centers are in communication with the wheel-engaging surface 34. Each of the support legs 90, 92, and 94 tapers from top to bottom such that the open center is larger at the wheel-engaging surface 34 than at the ground-engaging face 96, 98, and 100.

As can be readily seen in FIG. 2, each of the support legs 90, 92, and 94 also includes a pair of drain holes 102, 104, and 106, respectively, to extend through the ground-engaging faces 96, 98, and 100. The drain holes 102, 104, 106 enable water or other debris to drain out from the hollow support legs 90, 92, and 94 during cleaning of the ramp 10. It is also noted that during some uses of the ramp 10, an anchoring device such as a stake, bolt, nail, etc. (not shown) may be used in conjunction with the drain holes 102, 104, and 106 if the user desires to further secure the ramp 10 to the ground 20 in the support position.

With particular attention to the first support leg 90, a foot 108 is operably secured to a portion of the first face 96. It is noted that the foot 108 may be either permanently or removably secured to the first face 96 without departing from the teachings of the present invention. The foot 108 includes an arcuate face 110 and includes a plurality of ground-engaging ridges 112 that are configured for anti-skid engagement with the ground 20 during operation of the ramp 10. The foot 108 is preferably formed of a different material that exhibits higher friction than the material of the first face 96 (e.g., rubber) to ensure anti-skid engagement with the ground 20. It is noted that while only the first support leg 90 includes the foot 108, additional feet of similar construction (not shown) could alternatively be operably secured to the second support leg 92, the third support leg 94, or both, without departing from the teachings of the present invention.

With continued reference to FIG. 2, the body 22 of the ramp 10 further includes a plurality of ribs 114 disposed within the internal chamber 24 that each extend from a portion of the first support leg 92 to the leading margin 82 of the wheel-engaging surface 34. Each of the ribs 114 includes a toothed portion 116 disposed adjacent to the leading margin 82, with the toothed portion 116 being coplanar with and configured similarly to the teeth 52, 54 of the first surface margin portions 42, 44. The toothed portions 116 of the ribs 114 thus provide additional anti-skid surface area to the ramp 10 when in the ready position. The ribs 114 also add structural strength and promote easy removal of one ramp 10 from another ramp 10 when a plurality of ramps 10 are in a nested condition, as is described in detail below.

As described above, it is noted that often times a plurality of ramps 10 of like configuration may be used at the same time to lift and support multiple wheels (such as the pair of front wheels 14 of the mower 12 shown in FIG. 3). In such cases, storage of the multiple ramps 10 can be accomplished using less space by nesting the ramps 10 together. As will be readily appreciated by one of ordinary skill in the art upon review of this disclosure, numerous construction features of each ramp 10 cooperatively allow multiple ramps 10 to be nested together. For example, the outwardly angled side walls 28, 30 and the tapered support legs 90, 92, and 94 of one ramp 10 cooperate with like features of another ramp 10 such that the pair of ramps 10 can stack together vertically when viewed in the support position. Similarly, the matched pairs of outer protrusions 58 and inner recesses 64, and inner protrusions 62 and outer recesses 60, are correspondingly configured so that the protrusions 58, 62 are received within the recesses 64, 60 when multiple ramps 10 are stacked together vertically when viewed in the support position.

The nestability of multiple ramps 10 enables compact, space-efficient storage of the ramps 10 and facilitates ready portability for transportation of a pair or more of the ramps 10. It will be appreciated by one of ordinary skill in the art that once nested together, similarly configured components may tend to adhere to one another, or "stick" together, particularly when the components are formed from plastic. Accordingly, the ribs 114 on the body 22 serve to space one of the nested ramps 10 from the corresponding surfaces of the other nested ramp 10 by bearing against the wheel-engaging surface 34 to thereby prevent adhesion therebetween and thus facilitate a quick and easy removal of one ramp 10 from the other ramp 10.

Many of the structural features identified above cooperate to provide the ramp 10 with a strong and durable unibody construction without requiring excess material thickness. This construction enables the ramp 10 to be formed from a relatively lightweight material that can be cost-effectively mass-produced without comprising the strength and durability of the ramp 10. For example, the depicted ramp 10 can be formed from a synthetic resin material, such as injected molded plastic, preferably polypropylene or polyethylene. In this manner, the ramp 10 is strong, lightweight, readily transportable, and easy to store. While this unibody, molded plastic construction is preferred, it is clearly within the ambit of the present invention to form the ramp from virtually any material, including materials other than plastic, or in virtually any other manner, including constructions other than the depicted unibody configuration.

Turning briefly now to FIG. 8, a ramp 210 constructed in accordance with another embodiment of the present invention is depicted. It is initially noted that, with the specific exception of an alternative first support leg 212, the construction and features of the ramp 210 are the same as those of the ramp 10 described in detail above. Therefore, redundant descriptions will be avoided here. Rather, it is particularly noted that the detailed descriptions of the elements presented above also apply to this embodiment as if presented herein.

With continued reference to FIG. 8, the ramp 210 includes the first support leg 212 that is configured differently in shape than the first support leg 90 of the ramp 10. The support leg 212 extends downwardly and includes a portion configured to engage the ground 20 when the ramp 210 is in either the ready position or the support position. The support leg 212 includes a terminal ground-engaging face 214 at the bottom end thereof that is configured differently in shape than the ground-engaging face 96 of the ramp 10, although the tapered shape and function remain the same.

A foot 216 is operably secured to the ground-engaging face 214, which, similar to the foot 108, may either be permanently or removably secured to the face 214. It is noted that, in contrast to the configuration of the ramp 10, the foot 216 of the ramp 210 covers substantially the entire face 214. In addition, the ground-engaging face 214 of the support leg 212 does not include any drain holes. Additionally, the foot 216 includes an arcuate face 218 that includes a plurality of ground-engaging ridges 220 that are configured for anti-skid engagement with the ground 20 during operation of the ramp 210. It is noted that while the orientation of the ridges 220 is substantially perpendicular to the orientation of the ridges 112, their function remains the same, as will be readily appreciated by one of ordinary skill in the art upon review of this disclosure.

The operation of the ramp 10 (or, analogously, the ramp 210) should be apparent from the foregoing and, therefore, will be described here only briefly. With particular reference to FIGS. 5, 6, and 7, in order to lift and support the wheel 14 of a mower 12, or other vehicle, the ramp 10 is positioned on the ground 20 in the ready position, as shown in FIG. 5. In this position, the ramp 10 is supported on the first surface portion 40, with the teeth 52, 54 along the first margin portions 42, 44 of the sidewalls 28, 30 helping to hold the ramp 10 in place. It is noted that in the ready position, the ramp 10 is stable and supported on a generally planar first surface portion 40 of the ground-engaging face 26.

The wheel 14 is moved into a disposition adjacent the leading margin 82 of the wheel-engaging surface 34 of the ramp 10. To lift and support the wheel 14, an operator drives the mower 12 to move the wheel 14 along the wheel-engaging surface 34. The scalloped surface 84, including the pattern 86, may assist the wheel 14 in proper alignment with the ramp 10 and may also provide increased traction as the wheel 14 begins to move along the wheel-engaging surface 34.

With specific reference to FIG. 6, as the wheel 14 is driven along the wheel-engaging surface 34, the ramp 10 begins to rock backward about a fixed pivot point defined by the angle 56. As the wheel 14 continues to be driven along the wheel-engaging surface 34 from the driving surface portion 74 to the supporting surface portion 76, the ramp 10 continues to rock back about the fixed pivot point until the ramp 10 is disposed in the support position, as shown in FIG. 7.

With continued reference to FIG. 7, it will be appreciated that, in the support position, the ramp 10 is stable and supported on a generally planar second surface portion 46 of the ground-engaging face 26. Additionally, it is noted that in rocking about the fixed pivot defined by the angle 56, the ramp 10 rocks over center such that the support position is an equilibrium position. In more detail, each of the ready and support positions are equilibrium positions such that the body 22 does not move from either of the positions without the wheel 14 being driven. The rocking of the ramp 10 from the first substantially planar surface portion 42 to the second substantially planar surface portion 46 provides positive feedback to the operator of the mower 12, such that the operator is quickly aware of when the wheel 14 is fully supported such that driving of the mower can be stopped. As depicted in FIG. 7, the lip 88 at the end of the supporting surface portion 76 of the wheel-engaging surface 34 may be contacted by the wheel 14 to provide additional feedback to the operator and function as a stop for the wheel 14 if necessary to prevent the wheel 14 from being driven off of the ramp 10.

In order to lower the mower 12 off of the ramp 10, the operator need only drive the wheel 14 in reverse to shift the ramp 10 from the support position (shown in FIG. 7) back to the ready position (shown in FIG. 5) so that the wheel 14 is once again disposed on the ground 20. While the rocking of the ramp 10 from the support position to the ready position similarly provides feedback to the operator as the ramp moves back through the angle 56 from the substantially planar surface portion 46 to the substantially planar surface portion 42, it is believed that such feedback when lowering the wheel 14 may not be as advantageous as the feedback when lifting the wheel 14, since the wheel 14 is firmly supported on the ground 20 upon exiting the wheel-engaging surface 34 of the ramp 10.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A ramp for lifting and supporting a wheel of a vehicle thereon when the wheel is driven onto the ramp, said ramp comprising:

a body including opposite first and second ends, with a portion of the body tapering to the first end, said body including an upper wheel-engaging surface extending between the body ends, with the wheel-engaging surface being configured to engage the vehicle wheel when driven and supported thereon, said body including a ground-engaging surface extending between the body ends and being opposite the wheel-engaging surface, said ground-engaging surface including a first surface portion adjacent the first body end, with the wheel-engaging surface and the first surface portion converging toward the first body end, said ground-engaging surface including a second surface portion adjacent the second body end, with a portion of the wheel-engaging surface and the second surface portion being spaced apart in a substantially parallel relationship, each of said first and second surface portions being substantially planar, said first and second surface portions cooperatively defining an angle therebetween to present a body pivot about which the body rocks when the vehicle wheel is driven onto the wheel-engaging surface, said body being configured to rock about the pivot from a ready position, in which the first surface portion engages the ground to facilitate driving of the vehicle wheel onto the wheel-engaging surface, to a support position, in which the second surface portion engages the ground and the vehicle wheel is supported on the wheel-engaging surface and thereby elevated above the ground.

2. The lifting and supporting ramp as claimed in claim 1, said body being substantially hollow and including a pair of spaced apart sidewalls and a back wall, each of which extends between the wheel-engaging and ground-engaging surfaces, with the lower margins of the walls cooperatively defining the ground-engaging surface.

3. The lifting and supporting ramp as claimed in claim 2, said body defining an interior chamber between the sidewalls, the back wall, and the wheel-engaging surface, and an open face communicating with said chamber, said body including at least one supporting leg extending through the internal chamber between the wheel-engaging surface and the open face to present a ground-contacting leg portion.

4. The lifting and supporting ramp as claimed in claim 3, said ground-engaging leg portion including a foot, said foot being located generally at the body pivot, said foot including a ridged face configured to provide traction against the ground as the ramp rocks between the ready and support positions.

5. The lifting and supporting ramp as claimed in claim 4, said ridged face being arcuate to facilitate the rocking of the ramp.

6. The lifting and supporting ramp as claimed in claim 3, said supporting leg presenting a hollow center projecting from the wheel-engaging surface and an open leg face along the wheel-engaging surface, said open leg face presenting an area that is greater than that of the ground-contacting leg portion such that the supporting leg tapers toward the ground.

7. The lifting and supporting ramp as claimed in claim 2, each of said sidewalls presenting a first lower margin that defines part of the first surface portion and a second lower margin that defines part of the second surface portion, each of said first and second lower margins extending substantially linearly.

8. The lifting and supporting ramp as claimed in claim 7, said first lower margin presenting a first ground-engaging face, said first ground-engaging face including a plurality of teeth angled back toward the second margin and configured to grip the ground as the wheel contacts the ramp and moves the ramp from the ready position to the support position.

9. The lifting and supporting ramp as claimed in claim 8, said second lower margin presenting a second ground-engaging face, said second ground-engaging face being substantially flat and configured to provide bearing support to the wheel when the ramp is in the support position.

10. The lifting and supporting ramp as claimed in claim 1, said angle between the ground-engaging surface portions being obtuse.

11. The lifting and supporting ramp as claimed in claim 10, said angle between the ground-engaging surface portions being approximately 120 degrees.

12. The lifting and supporting ramp as claimed in claim 1, said wheel-engaging surface including a driving surface portion and a supporting surface portion.

13. The lifting and supporting ramp as claimed in claim 12, each of said driving surface portion and supporting surface portion being arcuate.

14. The lifting and supporting ramp as claimed in claim 13, said driving surface portion and said supporting surface portion being continuous.

15. The lifting and supporting ramp as claimed in claim 1, said wheel-engaging surface being embossed with a texture configured to provide traction against the wheel as the wheel is driven on the wheel-engaging surface.

16. The lifting and supporting ramp as claimed in claim 15, said wheel-engaging surface presenting a leading margin that is located adjacent the first body end and is configured to engage the vehicle wheel as the vehicle wheel is driven onto the ramp.

17. The lifting and supporting ramp as claimed in claim 16, said body including an upwardly extending lip that projects above the wheel-engaging surface, said lip being disposed adjacent the second body end to prevent the vehicle wheel from being driven off of the ramp.

18. The lifting and supporting ramp as claimed in claim 1, said body being formed of a synthetic resin material.

19. A pair of nestable ramps for lifting and supporting a pair of vehicle wheels when the wheels are driven onto the ramps, each of said ramps comprising:

a body including opposite first and second ends, with a portion of the body tapering to the first end, said body including an upper wheel-engaging surface extending between the body ends, with the wheel-engaging surface being configured to engage the vehicle wheel when driven and supported thereon, said body including a ground-engaging surface extending between the body ends and being opposite the wheel-engaging surface, said ground-engaging surface including a first surface portion adjacent the first body end, with the wheel-engaging surface and the first surface portion converging toward the first body end, said ground-engaging surface including a second surface portion adjacent the second body end, with a portion of the wheel-engaging surface and the second surface portion being spaced apart in a substantially parallel relationship, each of said first and second surface portions being substantially planar, said first and second surface portions cooperatively defining an angle therebetween to present a body pivot about which the body rocks when the vehicle wheel is driven onto the wheel-engaging surface, said body being configured to rock about the pivot from a ready position, in which the first surface portion engages the ground to facilitate driving of the vehicle wheel onto the wheel-engaging surface, to a support position, in which the second surface portion engages the ground and the vehicle wheel is supported on the wheel-engaging surface and thereby elevated above the ground, said body being substantially hollow and including a pair of spaced apart sidewalls and a back wall, each of which extends between the wheel-engaging and ground-engaging surfaces, with the lower margins of the walls cooperatively defining the ground-engaging surface, said body defining an interior chamber between the sidewalls, the back wall, and the wheel-engaging surface, and an open face communicating with said chamber, said body including at least one supporting leg extending through the internal chamber between the wheel-engaging surface and the open face to present a ground-contacting leg portion, said supporting leg presenting a hollow center projecting from the wheel-engaging surface and an open leg face along the wheel-engaging surface, said open leg face presenting an area that is greater than that of the ground-contacting leg portion such that the supporting leg tapers toward the ground.

20. The pair of lifting and supporting ramps as claimed in claim 19, said hollow center of the supporting leg of one of the ramps receiving a corresponding support leg of the other of the ramps, when the ramps are nested.

* * * * *